Dec. 28, 1926.
A. OPITZ
1,612,770
REVERSE GEAR
Filed June 5, 1926
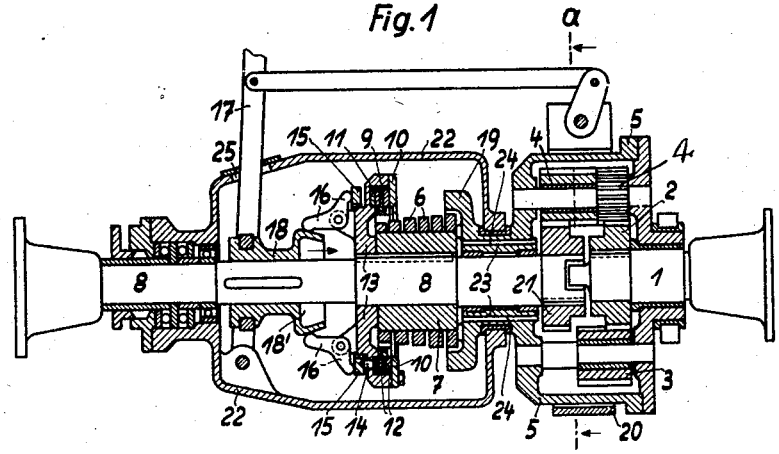
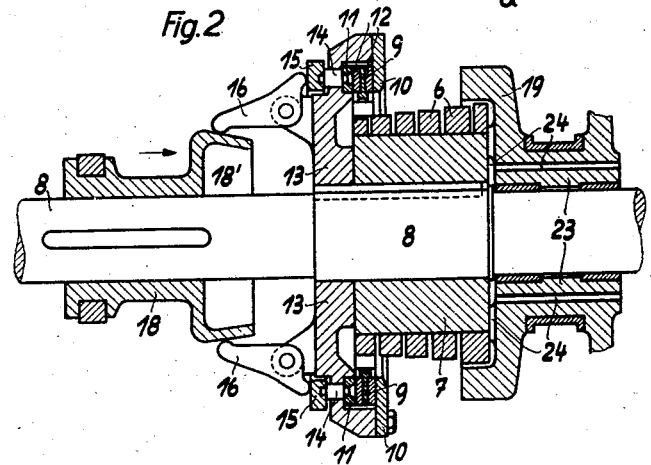
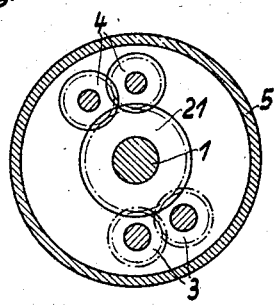
Inventor:
Adolf Opitz
Attorney.

Patented Dec. 28, 1926.

1,612,770

UNITED STATES PATENT OFFICE.

ADOLF OPITZ, OF HAMELN, GERMANY, ASSIGNOR TO FRANZ KAMINSKI, OF HAMELN A. W., GERMANY, AND OTTO HALTENHOFF, OF HANOVER, GERMANY.

REVERSE GEAR.

Application filed June 5, 1926, Serial No. 113,911, and in Germany February 6, 1924.

This invention relates to reverse gears, particularly for ships, and its purpose is the production of a type of gear suitable for low as well as high speeds, and applicable to the transmission of small power as well as to the driving of large motor ships.

A further purpose of the invention is the production of a gear that shall be simple to manufacture, that shall not require continual adjustment while in use, and that shall be of reasonably small dimensions even though designed for the transmission of considerable power.

The invention consists in the combination of spur gearing by which the reversal of drive is effected with a helical band friction clutch brought into action by an auxiliary clutch. The invention further consists in an improved construction of combined helical band clutch and disc clutch, and in improved mechanism for the operation of the combined clutch, as well as in various other features of construction that will better appear from the hereinafter detailed description.

By way of illustration of the invention a construction of a reverse gear for ships is shown in the accompanying drawings, Figure 1 being a longitudinal section of the gear.

Figure 2 an enlargement of a portion thereof and

Figure 3 a cross-section on the line a—a of Figure 1.

Figure 1 shows the gear in the position for driving the ship forward. The movement of the motor shaft 1 is transmitted to the spur wheel 2 keyed thereon, and from this through pairs of planet pinions 3 and 4, the gear casing 5 and the helical band clutch 6 and 7 to the propeller shaft 8, which therefore rotates in the same direction as the motor shaft. The gear runs solid.

In operation the shaft 8, which is held stationary, temporarily, due to the load, will hold the gear 21 when gear 2 is driven and the carrier 5 will rotate in a reverse direction thereby tightening up the clutch 6 on the sleeve 7 whereby after the gripping action of this spiral clutch has become effective the unit then revolves as a locked unit in the same direction as the driving shaft 1.

To bring the helical band friction clutch into action there is provided an auxiliary clutch 9, 10 and 11. The main element of this a friction disc or ring 9, having friction surfaces on both sides, which is fastened to the resilient head end of the helical band, and is of larger diameter than the main clutch. By the use of this auxiliary clutch in conjunction with the self-locking clutch-engaging device described below, the pressure necessary to place the clutch in action is reduced to a minimum and is transmitted to the shaft without endangering the working of the main clutch by axial pressure. The friction disc 9, shown in the drawings as a ring, is enclosed on the one side by the cover plate 10 which is also a friction disc and on the other side by the pressure ring 11. Lubricating pads 12 or the like are arranged in known manner between the parts 9, 10 and 11. The pressure ring 11 is secured upon a disc 13 rotating with the propeller shaft 8 to which it is keyed. In this disc are mounted studs 14 movable axially to press against the ring 11. The outer ends of the studs are received by a ring 15 which is actuated by bell-crank levers 16. These levers 16 are operated by a cone 18' which can be axially shifted by the clutch control lever 17 acting through the slip ring 18. The cone also locks the clutch in engaging position.

When the clutch is put in the cone 18' is forced against the bell-crank levers 16 which rock on their pivots on the disc or clutch carrier 13, and the pressure is transmitted by them through the ring 15 and studs 14 so that the friction ring 9 is gripped between the pressure ring 11 and the cover plate 10. Assuming the outer part of the main clutch, namely the helical spring 6, and therefore the ring 9 to be rotating, the slowing up of the ring 9 due to the frictional grip upon it will result in the first turn of the helical spring being frictionally engaged with the sleeve 7. The remaining turns of the helical spring will then successively wrap themselves upon the sleeve 7, capstan fashion, thereby slowly increasing the frictional drag upon the latter. The last turn of the spring being rigidly attached to the driving disc 19, the power is ultimately transmitted through it from the driving shaft 1 to the driven shaft 8. The angle of the cone 18' is such as to make it self-locking, so that there is no back pressure upon the slip ring 18. Moreover the auxiliary clutch being of larger diameter than the main clutch, and the cone and bell-crank levers affording the slip ring a considerable mechanical advantage, a very small pressure on the slip ring suffices to cause the friction ring 9 of the auxiliary clutch to be firmly gripped, and to bring the main clutch into action.

For the free engine position the clutch 6 and 7 is disengaged by pressing the slip ring 18 in the opposite direction, whereupon the propeller shaft 8 comes to a stand-still. For reversing the slip ring 18 is pressed further in the same direction, that is to say to the left in Figures 1 and 2, by which means the brake band 20 is contracted upon and grips the rotating gear casing 5. The wheels of the gear then begin to roll one upon the other. Power transmission is then from the spur wheel 2 keyed upon the motor shaft 1 to one of the two planet pinions 3, and also to one of the planet pinions 4 and the other of each pair of pinions 3 and 4 mesh with the sun wheel 21 keyed upon the propeller shaft, which therefore is rotated in the opposite direction to the motor shaft. The gear is changed by any convenient means, as by a hand wheel and worm, or through a chain or toothed wheel transmission, or simply as shown by a hand-lever 17. The clutch itself requires no adjustment in any respect during operation.

The whole gear runs in an oil bath. Between the gear casing 5 and the clutch casing 22 there is a journal bearing 23 which connects the casings together. In this bearing channels 24 are formed connecting the interiors of the two casings. These channels serve as an outlet for the heated oil and oil vapours evolved in the gear casing when the gear is not running solid, and form at all times an oil connection between the casings which simplifies and improves the lubrication in general. From the casing 22 oil vapours can escape through the slot 25, or an escape opening may be specially provided for the purpose. But the channels 24 might be replaced by any other suitable passage or exhaust device.

The friction surfaces 9, 10, and 11 may be conical instead of flat.

I claim as my invention:

1. A reversing gear particularly for ships comprising a driving shaft; a driven shaft; sun and planet gears; a casing for said gears; means for controlling said casing; a helical band secured at one end to said casing; a sleeve within said band secured to the driven shaft; a friction disc secured to the other end of said band; a clutch carrier mounted on said driven shaft; a second friction disc rotated by and axially movable on said clutch carrier; a bell-crank lever pivoted on said clutch carrier and one end contacting upon said second friction disc; a cone slidably mounted on said driven shaft and adapted to engage the other end of said bell-crank lever; and means for shifting said cone.

2. A reversing gear particularly for ships comprising two co-axial shafts; sun and planet gears; a casing for said gears; means for controlling said casing; a helical band connected at one end to said casing; a sleeve in said band connected to the other shaft; a friction disc secured to the other end of said band; a clutch carrier connected to the other shaft; a second friction disc secured on said clutch carrier adjacent the first-named disc; a third friction disc adjacent the first-named friction disc, said third friction disc being adapted to rotate with but is axially movable upon said clutch carrier; a plurality of bell-crank levers each pivoted on said clutch carrier and one end contacting with said third disc; a cone slidably mounted on said second shaft and adapted to engage and lock the other ends of said bell-crank levers; and means for shifting said cone.

3. A reversing gear particularly for ships comprising sun and planet gears; a casing for said gears forming bearings for the gears; a driving shaft for driving said gear; a driven shaft; a clutch for connecting said gear casing with the driven shaft; a casing surrounding said clutch; and a journal bearing for said driven shaft between and connecting said gear and clutch casings and having a channel therein for connecting the interiors of the casings.

In testimony whereof I affix my signature.

ADOLF OPITZ.